Nov. 14, 1944.   A. J. HUCK   2,362,751
TIMER FOR TOASTERS AND THE LIKE
Filed April 9, 1942   2 Sheets-Sheet 1
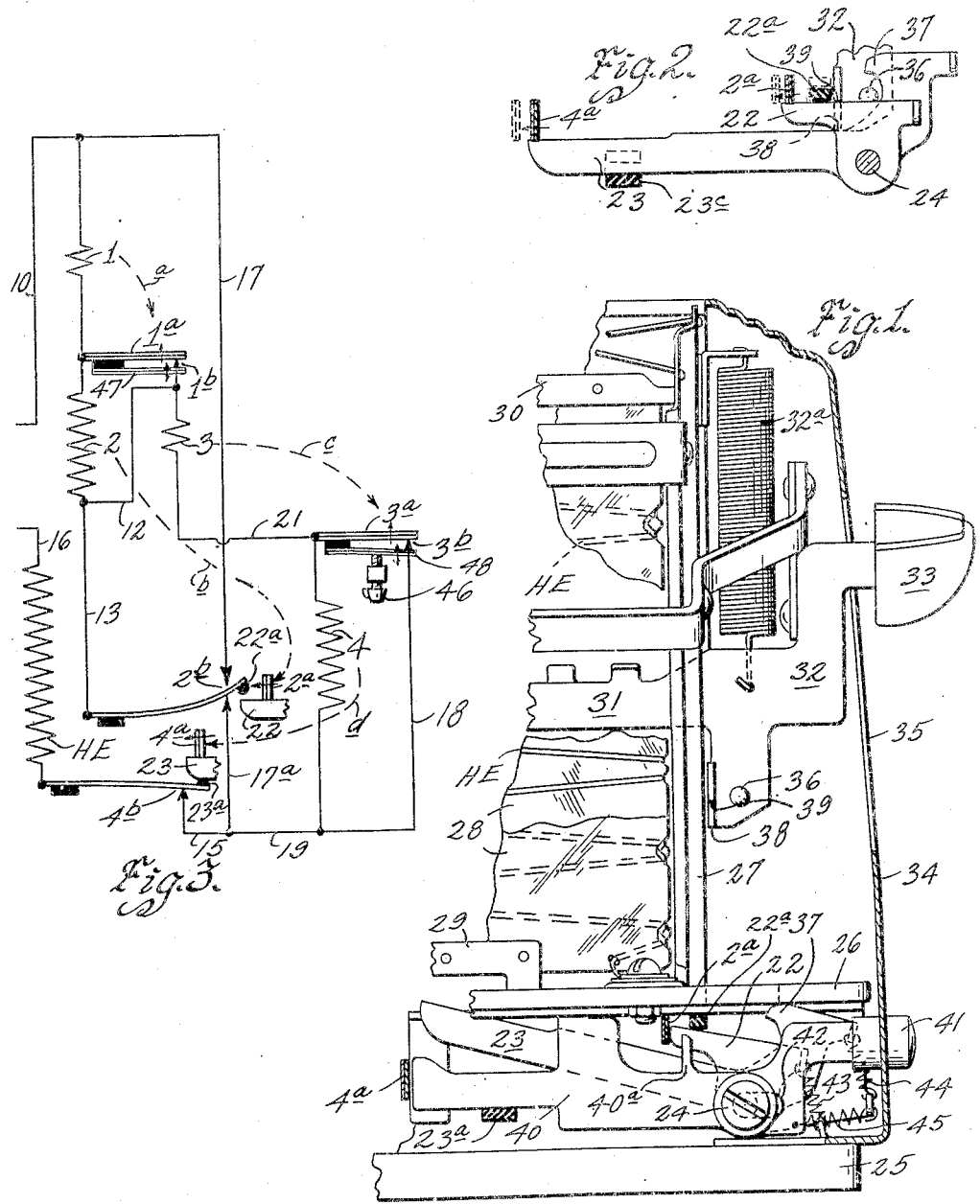

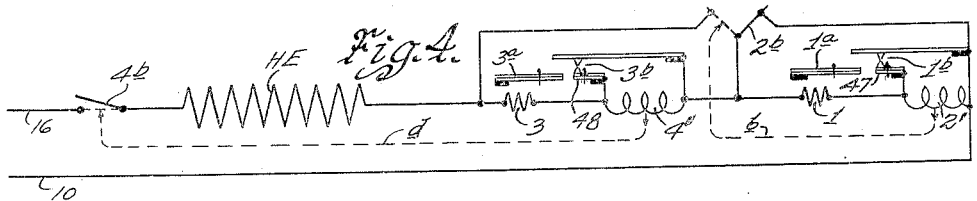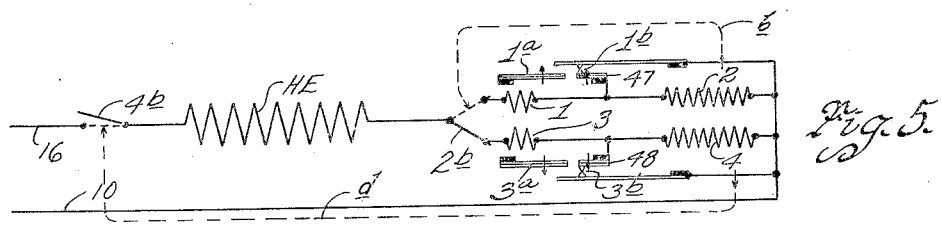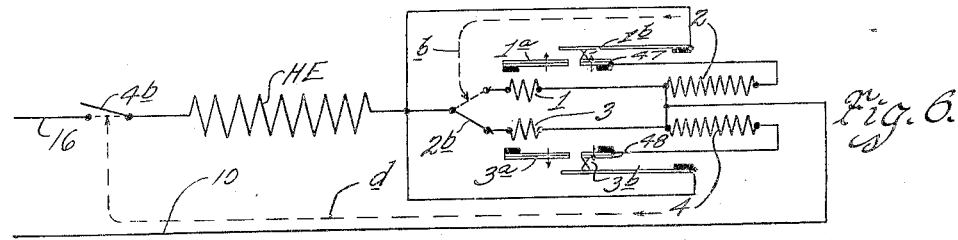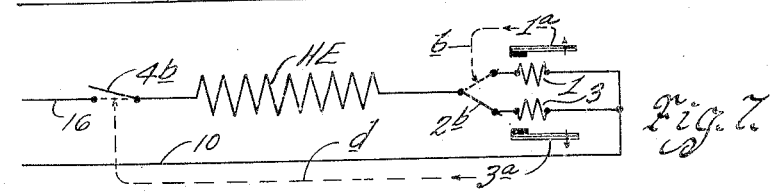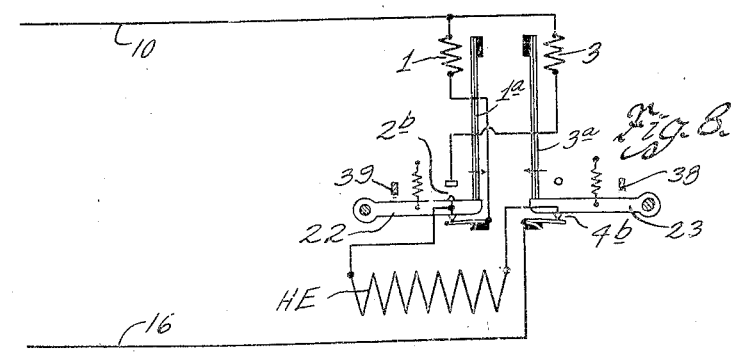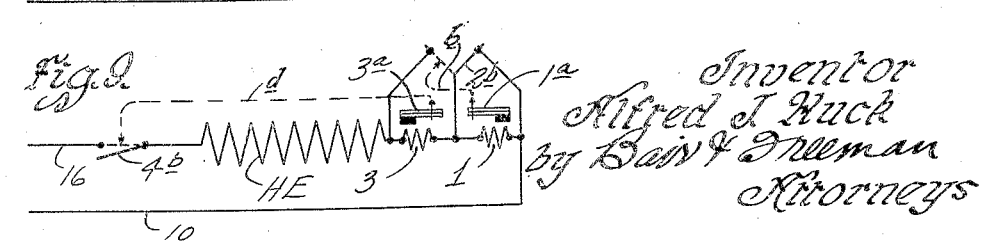

Patented Nov. 14, 1944

2,362,751

UNITED STATES PATENT OFFICE 2,362,751

TIMER FOR TOASTERS AND THE LIKE

Alfred J. Huck, St. Louis, Mo., assignor to Knapp-Monarch Company, St. Louis, Mo., a corporation of Missouri Application April 9, 1942, Serial No. 438,246

15 Claims. (Cl. 161—1)

My present invention has to do with a thermal timer for bread toasters and the like.

One object of the invention is to provide a relatively simple timing mechanism which has two timing devices operated in succession during a timing cycle so that the first one can cool down while the second one is finishing the timing cycle and thus be ready for a second timing cycle.

A further object is to provide means for permitting the second timing mechanism to cool down at the end of the timing cycle and while the first timing mechanism is again in use in a subsequent timing cycle.

Still another object is to provide timing mechanism which may be mounted in the base of a toaster or the like, and which is operable to thermally time the toasting operation with the gradual rise of temperature of the toaster affecting the timing mechanism so as to shorten the timing cycles as the general temperature of the toaster rises, thus producing even toasting of all slices of bread.

Still another object is to provide additional compensation for ambient temperature rise, if necessary, to insure that all slices of bread will be toasted alike, regardless of whether the toaster is just being warmed up or whether it has operated for a period of time.

Still another object is to provide timing mechanism which is manually set, as by depressing a bread carrier to toasting position, and which is automatically released at the end of a timing cycle so that the bread carrier may return to raised position, and simultaneously therewith a main switch controlling the circuit through the toaster may be opened for discontinuing the toasting circuit.

A further object is to provide a timer for toasters and the like which utilizes the operating principle of two or more timer mechanisms operating in succession, the operating time for each being a portion of the complete timing cycle, and the mechanism being adaptable to many different circuit arrangements to accomplish substantially the same result.

With these and other objects in view, my invention consists in the construction, arrangement and combination of the various parts of my device whereby the objects contemplated are attained, as hereinafter more fully set forth, pointed out in the claims and illustrated in the accompanying drawings in which:

Figure 1 is a sectional view through a toaster such as shown in my co-pending application Serial No. 418,455, filed November 10, 1941, with the improved timer of the present invention applied thereto;

Figure 2 is a view similar to a portion of Figure 1, showing the parts in a different position;

Figure 3 is an electro-diagrammatic view of the elements of my timer;

Figure 4 is a simplified electro-diagram of the same general type shown in Figure 3, utilizing electro-magnetic latch release coils instead of thermal-operated latches;

Figure 5 is an electro-diagrammatic view showing a further modification of the circuit wherein the timing heaters and latch heaters are arranged for selective energization, as distinguished from a shunting circuit, as in Figure 4;

Figure 6 is a diagrammatic view showing another modification wherein the latch operating heaters are open-circuited in order to terminate their operation as distinguished from being shunted out of the circuit, as in Figures 3, 4 and 5;

Figure 7 is a further modification showing a circuit wherein the timing heaters warp bimetal elements, and the elements act directly on the main switch and the auxiliary switch instead of effecting operation of latch heaters for the purpose of operating the auxiliary and main switches;

Figure 8 is another view of Figure 7, showing the mechanical arrangement used in connection with the circuit of Figure 7; and Figure 9 is a further electro-diagrammatic view of a circuit arrangement which can be used in connection with the mechanical arrangement of Figure 8, and has a shunting circuit for the timing heaters rather than an open-circuiting means therefor.

On the accompanying drawings (Figures 3, 5 and 6) the timer mechanism includes heaters 1, 2, 3 and 4 in the order of their energization during a timing cycle. The heater 1 is adapted to heat a bimetal element 1$^a$ for opening a thermal switch 1$^b$. The arrow $a$ indicates that the heater 1 acts upon the bimetal element 1$^a$. Likewise, arrows $b$, $c$ and $d$ indicate the heating action of the heaters 2, 3 and 4 on a bimetal latch 2$^a$, a bimetal element 3$^a$ of a thermal switch 3$^b$ and a bimetal latch 4$^a$, respectively. The bimetal elements 1$^a$, 2$^a$, 3$^a$, and 4$^a$ each have a small arrow crossing it to indicate which way the bimetal warps when heat is applied thereto.

The circuit disclosed in the drawings includes a heating element HE which is the heating element of the toaster or other device to be timed. The element HE, obviously, may be a heating element or any other electrically operated element of an appliance. The thermal timer includes a main switch 4ᵇ and an auxiliary switch 2ᵇ, the switch 2ᵇ being a double-throw switch. The main switch 4ᵇ is shown, Figure 3, as a leaf spring switch, and normally would be in open circuit position. For moving it to closed position an actuating arm 23 is provided, pivoted on a bolt 24 (see Figures 1 and 2). The bolt 24 is supported between a pair of base members 25 and 26 of a toaster having the heating element HE mounted therein and including a housing 34. The main switch 4ᵇ may be latched in the closed circuit position of Figure 2, by the depression of a bracket 32 of a bread carrier 31. A knob 33 is provided on the bracket 32, and the bracket slides in a vertical slot 35 of the housing 34. The bread carrier 31 and the bracket 32 are normally retained in raised position by a spring 32ᵃ, and when the bracket is depressed against the action of the spring, a shoulder 36 on the bracket engages the actuating arm 23 for swinging it from the position of Figure 1 to the position of Figure 2. The left end of the arm 23 thereby engages the bimetal latch 4ᵃ, swings it to the left, and after the arm passes the bimetal latch, the latch swings back to the position of Figures 2 and 3. The main switch 4ᵇ has an extension 33ᵃ of insulating material for the arm 23 to engage.

Likewise, the auxiliary switch 2ᵇ has an extension 22ᵃ of insulating material for engagement by an actuating arm 22, also pivoted on the bolt 24. The arm 22 is biased to the position of Figure 1 by a spring 39, and, likewise, the arm 23 is biased to the position of Figure 1 by a spring 40. When the bread carrier 31 is depressed, a shoulder 36 on the bracket 32 engages the arm 22, as shown in Figure 2, for swinging its left end under the bimetal latch 2ᵃ. The bracket 32 then returns upwardly a slight distance to give clearance for the lever 33 when it is subsequently released, and a pin 36 of the bracket 32 then assumes a stopped position under a catch lug 37 of the actuating arm 22. When the knob 33 is thereafter released, the lug 37 holds the pin 36 in lowered position against the bias of the spring 32ᵃ.

The actuating arms 22 and 23, after being latched by the bimetal latches 2ᵃ and 4ᵃ, may subsequently be automatically or manually released. The arms 22 and 23 are automatically released whenever the bimetals are warped from full to dotted positions illustrated in Figure 2. For manual release of the arms 22 and 23 a slide plate 40, having a slot 42 sliding on the bolt 24, is provided. A knob 41 thereon may be pushed for sliding the bar 40 toward the left against the bias of a spring 45 when manual release is desirable. The left end of the plate 40 and the projection 40ᵃ thereon will thereupon engage the bimetal latches 4ᵃ and 2ᵃ to move them to releasing position, as shown by dotted lines in Figure 2.

In connection with the thermal switches 1ᵇ and 3ᵇ, I have shown bimetal elements 47 and 48 for effecting reduced compensation, if necessary. The small arrows on these bimetal elements indicate the direction of warp upon temperature rise. The bimetal elements 1ᵃ and 3ᵃ compensate for ambient temperature rise because they effect opening of the switches 1ᵇ and 3ᵇ sooner when the temperature is high than when it is low. I have found, however, that, in most cases, this amount of compensation is excessive and results in lighter toast as the ambient temperature rises. Also the bimetals 1ᵃ and 3ᵃ do not tend to cool sufficiently in the average toaster switch chamber for obtaining even toasting of successive slices of bread.

The compensating bimetals 47 and 48 are therefore provided in order to decrease the compensating effect of the bimetals 1ᵃ and 3ᵃ. As the ambient temperature rises, the compensating bimetal elements 47 and 48 increase the pressure of the contacts of the switches 1ᵇ and 3ᵇ which the compensating bimetal elements carry, and, therefore, the bimetal elements 1ᵃ and 2ᵃ are required to warp farther before contact separation occurs. Upon cooling, the bimetals 1ᵃ and 3ᵃ close the switches 1ᵇ and 3ᵇ sooner because of the action of the bimetals 47 and 48, thus permitting toasting operations closely following one another.

The timing period may be adjusted for dark or light toast, as desired, as by an adjusting screw 46 (see Figure 3) for changing the operating time of the switch 3ᵇ. Obviously, instead of the switch 3ᵇ being adjusted, the switch 1ᵇ might be adjusted, or, if desired, both of them could be adjusted for thus changing the timing period.

The heaters 1, 2, 3 and 4, and the thermal switch 1ᵇ and 3ᵇ may be connected in the circuit, as shown in Figure 3, various wires being numbered for reference in hereinafter describing the operation of the timer.

Circuit arrangements other than that shown in Figure 3 may be used in connection with a thermal timer of the type herein disclosed. In Figure 4 I have shown substantially the same circuit arrangement with electromagnetic coils 2' and 4' in place of the heater coils 2 and 4. The main switch 4ᵇ may be latched in closed position, and then unlatched when the electromagnet 4' becomes energized, or the main switch 4ᵇ may be manually closed and then, upon energization of the electromagnet 4' it may be positively opened by the electromagnets in a well-known manner. Similarly the auxiliary switch 2ᵇ may be latched closed, and unlatched by the electromagnet 2', or may be closed, and thereafter positively opened by energization of the electromagnet.

In Figure 5, I show an arrangement wherein the heaters 3 and 4, or the heaters 1 and 2, may be selectively energized instead of selectively shunted out of the circuit, as in Figures 3 and 4. Otherwise, the operation is substantially the same.

In Figure 6 I show a possible circuit arrangement wherein the heaters 1 and 3 are selectively energized and the latch heaters 2 and 4 are thereafter cut into the circuit in parallel to the heaters 1 and 3 instead of in series therewith.

Figure 7 illustrates a circuit arrangement that permits the elimination of latch heaters, the bimetal latches 1ᵃ and 3ᵃ acting directly on the auxiliary switch 2ᵇ and the main switch 4ᵇ, as more clearly shown in Figure 8. In this figure the mechanical parts used in connection with the circuit of Figure 7 are illustrated.

Figure 9 shows a circuit arrangement that can be used in connection with mechanical arrangement of Figure 8, wherein the auxiliary switch 2ᵇ operates to shunt one or the other of the timing heaters 1 or 3 out of the circuit instead of selectively controlling the circuit to one or the other thereof, as in Figures 7 and 8.

*Practical operation*

In the operation of my timer (considering, first, the circuit shown in Figure 3) the actuating arms 22 and 23 may be latched by the latches 2a and 4a at the beginning of the timing period when bread is placed in the toaster. This, as already explained, is accomplished by depressing the knob 33, the parts thereupon assuming the positions of Figures 2 and 3. Current may now be traced from the line wire 10 through the following elements—1, 1a, 1b, 12, 13, 2b, 17a, 15 and 4b to the heating element HE, thereupon returning to the other line wire 16. In this position of the parts the thermal switch 1b is shunting the heater 2 out of the circuit, and the direct wire connection 12, 13 and 17a shunts the heaters 3 and 4 out of the circuit, so that the heater 1 is the only one in operation. The heater 1 continues to heat for about one half the timing cycle. At the end of that time it has warped the bimetal element 1a to such an extent that the thermal switch 1b is opened. Thereupon, current from wire 10 passes through 1, 2, 13, 2b, 17a, 15, 4b and HE to 16. This causes the heater 2 to relatively quickly move the bimetal element 2a to released position, where it no longer latches the actuating arm 22 in lowered position.

Accordingly, the spring 32a swings the arm 22 from the position of Figure 2 to the position of Figure 1, thereby changing the position of the switch 2b so that it is in contact with the wire 17 rather than the wire 17a. The wire 17 then shunts the heaters 1 and 2 out of the circuit as current now flows directly from the wire 10 through 17 to the switch 2b. From there the current passes through 13 and 12 to the heater 3, and then through wires 21, 18, 19 and 15 to the main switch 4b. In this position of the parts the heater 3 is the only one in the circuit, and it is a timing heater, as was heater 1.

At the end of the second half of the timing cycle the heater 3 has heated the bimetal element 3a sufficiently to open the thermal switch 3b, whereupon the heater 4, which was shunted out of the circuit by the switch 3b and the wire 18, then becomes energized to relatively quickly warp the bimetal latch 4a to released position. This position is shown by dotted lines in Figure 2, and when the bimetal leaves the left end of the actuating arm 23 it is raised by the spring 44 to leave the insulation extension 23a of the main switch 4b, thereby permitting it to open. Opening of the main switch cuts off the current to the toaster and to all the heaters.

The heaters 1 and 3 are timing heaters operating the thermal switches 1b and 3b relatively slowly for the first and second halves respectively of the timing period. Although I have shown only two timing mechanisms, one for the first half and one for the second half of the timing period, it is to be understood that this is by way of illustration only, and, actually, the timing period may be split into three or more sections, if desired, having a similar timing mechanism for each one, the timing mechanisms operating successively, and the last one effecting opening of the main switch and release of the bread carrier.

The heaters 2 and 4 are designed to heat relatively quickly to minimize the time period and secure sufficient energy for quick release of the latches 2a and 4a with respect to the actuating arms 22 and 23 without requiring critical settings. The time required for heating of the heaters 2 and 4 may be eliminated by the arrangement shown in Figure 4 wherein the electromagnets 2' and 4' would operate substantially instantaneously upon opening of the respective timer switches 1b and 3b. In this figure the heaters 1 and 3 act upon the bimetal elements 1a and 3a to warp them upwardly to engage the leaf springs carrying the upper contacts of the switches 1b and 3b for separating the contacts. The electromagnets may release latches for the switches 2b and 4b or act positively to throw them open after they have been manually closed and the timing periods have expired.

In the operation of the circuit in Figure 5 the auxiliary switch 2b is normally in the position shown by solid lines, and when it and the main switch 4b are moved to their operating positions, shown by dotted lines, by the depression of the bread carrier, the circuit may be traced through 10, 1b, 1, HE and 4b to 16. The timing heater 1, after expiration of the first part of the timing period, opens the switch 1b which shunted the latch heater 2 out of the circuit so that the latch heater now operates to change the position of the auxiliary switch 2b. The circuit may then be traced from 10 through 3b, 3, 2b, HE and 4b to 16. When the bimetal element 3a opens the switch 3b, the latch heater 4 becomes energized for soon opening the main switch 4b. Thus, the switch 2b acts as a selector switch for the upper circuit through heaters 1 and 2, and, later, the lower circuit through heaters 3 and 4, as distinguished from shunting out the heaters 3 and 4 of Figure 3 and then, after the auxiliary switch is tripped, shunting out the heaters 1 and 2.

In Figure 6, when the bread carrier is lowered, the main switch 4b and the auxiliary switch 2b are closed, in the dotted position. The circuit may then be traced from 10 through 1, HE and 4b to 16. The switch 1b, being open, prevents any current flow through the latch member 2. At the end of the first part of the timing cycle the switch 1b is closed by the bimetal element 1a, which results in a further circuit from 10 through 2, 1b, HE and 4b to 16. In this circuit the heater 2 shunts the heater 1 instead of being in series with it, as in Figures 3 and 5. Similarly, after the auxiliary switch 2b shifts to the full-line position, the heater 3 is energized, and, later, the heater 4 in shunt therewith to eventually open the main switch 4b.

Figures 7 and 8 illustrate how the timing mechanism may be simplified by eliminating the heaters 2 and 4, the bimetal elements 1a and 3a serving as latches for the auxiliary switch arm 22 and the main switch arm 23. The switch arms may be latched in the position of Figure 8 (dotted positions of the auxiliary switch 2b and the main switch 4b in Figure 9) by depressing the bread carrier so that the shoulders 38 and 39 thereof depress the levers 23 and 22 to latched positions with respect to the bimetal elements 1a and 3a. The circuit may now be traced from 10 through 1, the lower contacts of 2b, HE and 4b to 16, so that the heater 1 will eventually warp the latch 1a to position for permitting the switch 2b to shift to its opposite position, shown by full lines in Figure 7. The circuit then passes through the heater 3 for unlatching the bimetal element 3a from the arm 22, whereupon the main switch 4ᵇ is opened.

The simplified arrangement of Figure 8 may be used in connection with a circuit as shown in Figure 9, wherein the auxiliary switch 2ᵇ first shunts the heater 3 out of the circuit, and, after the switch 2ᵇ has been shifted by unlatching of the bimetal element 1ᵃ, then the heater 1 is shunted out of the circuit.

From a consideration of these various circuits, it is obvious that a number of circuit arrangements are available for accomplishing the complete timing cycle by successive operation of two or more timer mechanisms.

My arrangement is such that the heater 1 cools down during the second half of the timing cycle, and even if the toaster is reloaded immediately, is in proper position for taking care of the first half of the second timing cycle, with the second timing heater 3 having a chance to cool down during such first half of the second cycle. Thus it is unnecessary to wait between toasting operations for the parts to cool down in order to operate properly. At the same time, the general rise in temperature of the toaster causes the thermal switches 1ᵇ and 3ᵇ to operate more quickly to compensate for the ambient temperature rise and thus maintain an even toasting of all slices of bread. The compensation may be further affected, if necessary, by the addition of the compensating bimetal elements 47 and 48.

The double-throw switch 2ᵇ is provided, and it is manually set so that after it is once tripped by heat of the heater 2 warping the bimetal element 2ᵃ to releasing position, it will be returned to its normal position by the actuating arm 22, so that, thereafter, it is impossible during the timing cycle for a recycling to occur by the thermal switch 1ᵇ reclosing as a result of the heater 1 cooling down. Thus proper sequential operation of the heaters and the bimetal elements operated by then is assured throughout a timing cycle after initial manual setting of the timer. Likewise, at the end of the timing cycle, the main switch 4ᵇ is opened so that current is discontinued to all heating elements and there is no possibility of reenergization by the cooling of any of the bimetal elements, energization being then possible only by a manual resetting operation.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a thermal timer for toasters and the like, a first timer having a heater adapted to be energized upon manual setting and electrical energization of the heating element of the toaster, a manually settable switch controlled thereby, a second timer having a heater adapted to be energized upon movement of said switch from manually set position to released position during the first part of the timing cycle, said switch in released position deenergizing said first timer, and means operable by said second timer after a second part of the timing cycle to deenergize the heating element of the toaster.

2. In a timer for toasters and the like, a first timer adapted to be energized upon energization of the heating element of the toaster by manual latching of the main switch thereof in closed circuit position, an auxiliary switch also manually latchable and controlled as to release by said first timer, a second timer adapted to be energized upon release of said auxiliary switch during the first part of the timing cycle, said auxiliary switch in released position denergizing said first timer, and means operable by said second timer at the expiration of the timing cycle to release said main switch.

3. In a thermal timer for toasters and the like, a manually settable main switch for the heating element of the toaster, a thermal latch therefor, a first heater in series with said main switch and adapted to be energized upon closure of said main switch, a thermal switch controlled thereby, a manually settable auxiliary switch adapted to be released by said thermal switch, a second heater in series with said main switch and adapted to be energized upon movement of said thermal switch from normal position to the position it assumes by heating of said first heater after a first part of the timing cycle and by release of said auxiliary switch, said auxiliary switch in said last position deenergizing said first heater, and means operable by said second heater after a second part of the timing cycle to release said thermal latch and thereby permit said main switch to return to open circuit position.

4. In a thermal timer for toasters and the like, a manually settable switch for the heating element of the toaster, a first heater adapted to be energized upon closure of said manually settable switch, a thermal switch controlled thereby, a second heater adapted to be energized upon movement of said thermal switch from normal position to the position it assumes by heating of said first heater after a first part of the timing cycle, means operable by said second heater after a second part of the timing cycle to release said thermal latch and thereby permit said manually settable switch to return to open circuit position, a double-throw switch normally assuming one position and adapted to assume another position upon operation of said manually settable switch, a thermal latch therefor, said thermal latch being operable to released position as a result of said thermal switch opening at the end of said first part of the timing cycle, said double-throw switch effecting energization of said second heater until the expiration of said second part of the timing cycle.

5. In a thermal timer, a manually settable circuit controlling switch, a thermal latch therefor, a first heater adapted to be energized upon closure of said switch, a thermal switch controlled by said first heater, a second heater adapted to be energized upon movement of said thermal switch from normal position to the position it assumes by heating of said first heater after a first part of the timing cycle, a double-throw switch normally assuming one position and adapted to assume another position upon operation of said manually settable switch, a thermal latch therefor, said last thermal latch being released as a result of said thermal switch opening at the end of said first part of the timing cycle, said double-throw switch thereupon deenergizing said first heater, and means operable by said second heater after a second part of the timing cycle to release said first thermal latch and thereby permit said manually settable switch to return to open circuit position.

6. In a thermal timer of the kind described, a manually settable switch, a thermal latch therefor, a first heater adapted to be energized upon closure of said switch, a double-throw switch normally assuming one position and adapted to assume another position upon operation of said manually settable switch, a thermal latch therefor, said last thermal latch being released as a result of operation of said first heater at the end of a first part of the timing cycle, a second heater adapted to be energized upon movement of said double-throw switch from set position to the position it assumes by heating of said first heater after said first part of the timing cycle, said double-throw switch in said last position deenergizing said first heater, and means operable by said second heater after a second part of the timing cycle to release said first thermal latch and thereby permit said manually settable switch to return to open circuit position.

7. In a thermal timer for toasters and the like, a manually settable switch for the heating element of the toaster, a first thermal latch therefor, a first heater adapted to be energized upon closure of said manually settable switch, a first thermal switch and a double-throw switch controlled thereby, said double-throw switch normally assuming one position and adapted to assume another position upon operation of said manually settable switch, a second thermal latch for said double-throw switch, a second heater adapted to be energized upon movement of said double-throw switch from latched position to the position it assumes by heating of said first heater after a first part of the timing cycle, said double-throw switch in said last position deenergizing said first heater, means operable by said second heater after a second part of the timing cycle to release said first thermal latch and thereby permit said manually settable switch to return to open circuit position, said second thermal latch being operable as a result of said first thermal switch opening at the end of said first part of the timing cycle, said double-throw switch effecting energization of said second heater until the expiration of said second part of the timing cycle.

8. In a thermal timer for installation in a circuit to be controlled, a settable main switch, a thermal latch therefor, first and second heaters, an auxiliary switch normally shunting said heaters out of the circuit, said auxiliary switch being settable to another position upon setting of said main switch and thereby permitting said first and second heaters to become energized in the circuit, a second thermal latch for said auxiliary switch in said another position, a thermal switch actuated by said first heater to open a circuit normally shunting said second heater, a third heater shunted by said auxiliary switch in its said another position, said second heater opening said second thermal latch for said auxiliary switch, said third heater being energized when said auxiliary switch is released, a second thermal switch actuated by said third heater and a fourth heater normally shunted by said second thermal switch, said fourth heater, when energized, releasing said thermal latch for said main switch.

9. In a timer for installation in a circuit to be controlled, a main switch, a latch therefor, a first heater, an auxiliary switch in normal position shunting said first heater out of the circuit, said auxiliary switch being settable to another position permitting said first heater to become energized in the circuit, a second latch for said auxiliary switch in said another position, a thermal switch actuated by said first heater to effect release of said second latch, a second heater shunted by said auxiliary switch in said another position, a second thermal switch for said second heater, said second thermal switch effecting release of said latch for said main switch.

10. In a thermal timer, a main switch, an electrically released latch therefor, first and second heaters, an auxiliary switch normally preventing a circuit in said first heater and permitting said second heater to be in the circuit for heating, said auxiliary switch being settable to another position permitting said first heater to be in the circuit for heating and preventing a circuit in said second heater, a second electrically released latch for said auxiliary switch in said another position, a first timer actuated by said first heater to release said second latch, and a second timer actuated by said second heater to release said first latch.

11. In a timer for installation in a circuit to be controlled, a manually settable main switch, first and second timers, an auxiliary switch therefor, said auxiliary switch being settable to one position simultaneously with said main switch as it is set permitting only one of said timers to become energized in the circuit, one of said timers at the end of a timing period effecting a shift of said auxiliary switch to a position transferring electrical energization from said one of said timers to said other one, said other timer, after a further timing period, effecting opening of said main switch.

12. In a thermal timer, a main switch, a latch therefor, a first heater, an auxiliary switch normally shunting said first heater out of the circuit, said auxiliary switch being settable to another position permitting said first heater to become energized in the circuit, a second latch for said auxiliary switch in said another position, a thermal switch actuated by said first heater to release said second latch, a second heater shunted by said auxiliary switch in its said another position, a second thermal switch, said second heater, upon energization, causing said second thermal switch to effect release of said latch for said main switch.

13. In a thermal timer for installation in a circuit to be controlled, a main switch, a first thermal latch therefor, first and second heaters, an auxiliary switch normally shunting said heaters out of the circuit, said auxiliary switch being settable to another position permitting said first and second heaters to become energized in the circuit, a second thermal latch for said auxiliary switch in said another position, a thermal switch actuated by said first heater to open a circuit normally shunting said second heater, a third heater shunted by said auxiliary switch in said another position thereof, said second heater releasing the latch for said auxiliary switch, a second thermal switch controlled by said third heater, a fourth heater controlled by said second thermal switch, said fourth heater, upon energization, effecting release of said first thermal latch.

14. In a timer apparatus for toasters and the like, a first timer adapted to be energized upon energization of the heating element of the toaster, a switch controlled thereby, a second timer adapted to be energized upon movement of said switch from one position to another at the end of the first part of the timing cycle, said switch in said another position deenergizing said first timer, means operable by said second timer after a second part of the timing cycle to deenergize the heating element of the toaster, said timers inherently compensating for the rise of ambient temperature, and additional compensating means to prevent over-compensation by said timers as the ambient temperature rises.

15. In a thermal timer for toasters and the like, a manually settable main switch for the heating element of the toaster, a first heater adapted to be energized upon closure of said main switch, a manually settable auxiliary switch adapted to be released by said first timer at the end of a timing period, a second timer adapted to be energized upon movement of said auxiliary switch by said first timer, and means operable by said second timer to effect opening of said main switch at the end of a further timing period.

ALFRED J. HUCK.